United States Patent [19]

Logullo

[11] Patent Number: 5,102,943
[45] Date of Patent: Apr. 7, 1992

[54] THERMOFORMED ARTICLES WITH IMPROVED EASE OF CUTTING AND RESISTANCE TO STICKING

[75] Inventor: Francis M. Logullo, Hockessin, Del.

[73] Assignee: E. I. Du Pont de Nemours and Company, Wilmington, Del.

[21] Appl. No.: 622,420

[22] Filed: Dec. 4, 1990

[51] Int. Cl.$^5$ .............................................. C08L 33/00
[52] U.S. Cl. ..................................... 524/487; 524/275; 524/539; 524/540; 524/604; 524/605
[58] Field of Search ............... 524/275, 487, 604, 605, 524/539, 540

[56] References Cited

U.S. PATENT DOCUMENTS

| | | | |
|---|---|---|---|
| 3,619,267 | 11/1971 | Weissermel et al. | 524/277 |
| 3,624,041 | 11/1971 | Brandrup et al. | 524/605 |
| 3,960,807 | 6/1976 | McTaggart | 264/40 R |
| 4,351,758 | 9/1982 | Lu et al. | 524/227 |
| 4,365,036 | 12/1982 | Lee | 524/299 |
| 4,380,621 | 4/1983 | Nield et al. | 528/287 |
| 4,448,913 | 5/1984 | Coleman et al. | 523/455 |
| 4,463,121 | 7/1984 | Gartland et al. | 524/291 |
| 4,506,043 | 3/1985 | Ogawa et al. | 523/523 |
| 4,705,844 | 11/1987 | Espenschied et al. | 528/275 |
| 4,801,640 | 1/1989 | Dallmann et al. | 524/394 |

FOREIGN PATENT DOCUMENTS 56-109245 8/1981 Japan.

OTHER PUBLICATIONS

Derwent 84-192396/31 (JA59/109551), 6/25/84.
Derwent 82-2262 E/12 (JA 57/025352), 2/10/82.
Derwent 82-60757E/29 (JA 57/09639), 6/15/82.
Derwent 81-08569D/06 (JA55/154130), 12/1/80.
Derwent 79-08563B/05 (JA53/143651), 12/14/78.

*Primary Examiner*—Paul R. Michl
*Assistant Examiner*—Edward J. Cain
*Attorney, Agent, or Firm*—David M. Shold

[57] ABSTRACT

Thermoformed trays prepared from a blend of 90 to 99.9 percent of polyethylene terephthalate resin, a small amount of sodium ion, and a small amount of wax exhibit effective crystallization rates and improved trimming and stacking properties.

9 Claims, No Drawings

THERMOFORMED ARTICLES WITH IMPROVED EASE OF CUTTING AND RESISTANCE TO STICKING

BACKGROUND OF THE INVENTION

This invention relates to thermoformed articles such as trays and a method for improving their preparation and handling properties.

There has been much work developing polyester compositions which have improved crystallization rates. For example, U.S. Pat. No. 4,380,621 discloses a fast crystallizing polyester in which at least some of the end groups of the polyester have the formula $-Y-M^+$, where $M^+$ is an alkaline metal ion, preferably sodium. The compositions can be prepared by polymerizing the polyester in the presence of an alkaline metal salt or corresponding base, such as NaOH. The composition can be compounded with various additives, including an oxidized polyethylene wax containing carboxylic acid groups. The composition is useful preparing molding powder for use in preparing injection molded articles.

U.S. Pat. No. 4,801,640, discloses a polyester film with improved dimensional stability, abrasion resistance, drawability, and slip properties. The film contains hardened organic particles such as melamine/formaldehyde resin and a nucleating agent selected from various alkali metal salts, including salts of ester waxes.

U.S. Pat. No. 4,365,036 discloses fast crystallizing polyalkyleneterephthalate resins containing a crystallization promoter which is a complex of sodium iodide and a polymeric compound, together with fillers or additives including paraffin. The product is useful as a molded composition.

U.S. Pat. No. 4,448,913 discloses polyethylene terephthalate molding compositions characterized by rapid crystallization, provided by combining PET and a filler or reinforcing agent with a crystallization rate promoter comprising sodium benzoate and a poly-alpha-olefin such as low density polyethylene. Examples of the composition include small amounts of wax.

U.S. Pat. No. 3,960,807 discloses thermoformed articles such as trays from thermoplastic, crystallizable polyester, a polymeric crack stopping agent such as poly-4-methylpentene-1, and a nucleating agent such as talc.

U.S. Pat. No. 4,463,121 discloses walled thermoformed articles of partially crystallized polyethylene terephthalate containing a minor component of a polyolefin which exhibit improved impact resistance. Traditional nucleating agent (such as talc) are not required.

Japanese publication 57/025352 discloses a polyester resin composition with improved mold release property, comprising glass fiber, a metal chelate such as sodium acetylacetone chelate, montan wax, and PET resin. The composition has excellent moldability, mold release property, and luster.

Japanese publication 59/109551 discloses a dimensionally stable polyester resin composition prepared by adding montan wax ester to glass fiber reinforced PET. Good mold release properties are imparted.

Japanese publication 57/096,039 discloses a polybutylene terephthalate resin composition including ammonium polyphosphate and paraffin. The resin composition has good mechanical properties and external appearance.

Japanese publication 55/154,130 discloses a slidable polyester film containing micropowdered silica coated with polyolefin wax. The blend is extruded into a sheet which is then stretched.

Japanese publication 56/109,245 discloses a polyethylene terephthalate resin composition containing e.g. polyethylene wax. A crystal nucleating agent such as sodium benzoate or stearate, etc., may be present. The composition exhibits a glossy appearance even when molded in a low temperature metallic mold.

Japanese publication 53/143,651 discloses rotary articles obtained by blending polybutylene terephthalate resin with a wax which is solid at ordinary temperatures.

Plastic trays suitable for oven use have become increasingly popular in recent years. A commonly used plastic for making such trays is crystalline polyethylene terephthalate (CPET), since it provides good high temperature properties and can withstand cooking at e.g. 200° C. or above for 0.5 hours or longer. Often CPET compositions include crystallization promoters such as low density polyethylene in levels of up to several percent, to provide rapid crystallization for ease of processing. However, the use of such blends of polymers have certain disadvantages. In particular it has become apparent that polymeric blends are generally less readily recyclable than are compositions consisting of substantially a single polymer. In view of the current interest in providing polymeric articles which are readily recyclable, it is desirable to provide a composition for trays and other thermoformed compositions comprising polyethylene terephthalate as substantially the only polymeric component.

In addition to such recycling concerns, PET compositions containing other polymers can present processing difficulties. For example, PET pellets almost always need to be dried at high temperature before melt processing. Pellets of polyethylene, however, cannot withstand high temperatures without melting. Thus formed articles which contain a significant amount of polyethylene cannot be readily prepared from a "single bag" mixture of pellets of PET and the polyethylene. Furthermore, it has been found that polyethylene in such blends can lead to deposits on casting rolls and vacuum forming equipment. In order to avoid these difficulties, the present invention provides articles made from CPET which retain processability and rapid crystallization without addition of polyethylene.

SUMMARY OF THE INVENTION

The present invention provides thermoformed articles such as trays, prepared from a blend consisting essentially of (a) about 90 to about 99.9 percent by weight of a thermoplastic, crystallizable polyester resin;

(b) an amount of sodium ion sufficient to function as an effective crystallization agent; and (c) an amount of wax sufficient to reduce formation of hairs and feathered edges upon trimming of the article and to reduce the tendency of a multiplicity of said articles to stick together when stacked.

The invention further provides a process for preparation of a thermoformed article, comprising the steps of (a) blending together (i) about 90 to about 99.9 percent by weight of a thermoplastic, crystallizable polyester resin;

(ii) an amount of sodium ion sufficient to function as an effective crystallization agent; and (iii) about 0.05 to about 1.5 percent by weight of wax;
(b) extruding the blend into a sheet;
(c) thermoforming the sheet into an article; and
(d) trimming excess material from the periphery of the thermoformed article.

DETAILED DESCRIPTION OF THE INVENTION

Thermoformed articles of the present invention are made from a blend comprising mostly a thermoplastic, crystallizable polyester resin. Suitable polyester resins include certain polyalkylene terephthalates, polyethylene 2,6-naphthalenedicarboxylate, poly-1,4-di(methylene)-cyclohexane terephthalate, and especially polyethylene terephthalate (PET). PET is a well known material, prepared by a condensation polymerization process to provide a polymer of alternating units derivable from ethylene glycol and terephthalic acid. Small amounts of other comonomers derivable from such entities as isophthalic acid or cyclohexane dimethanol may be incorporated to change the melting point or crystallization rate of the polymer; a branching agent, such as trimethylolpropane, pentaertythritol, or a comonomer derivable from a benzene tricarboxylic acid such as trimellitic acid, may be incorporated to provide for improved melt strength. Polymers with improved melt strength are more easily cast into flat sheet which does not "neck in" as it exits the die. The amount of PET in the composition used to form the articles may be for example about 90 to about 99.9 percent by weight and is preferably about 99 to about 99.8 percent by weight.

To the PET is added an amount of sodium ion sufficient to function as an effective crystallization agent to permit an efficient thermoforming process to be carried out. This sodium ion will normally be present as a counterion in association with carboxylate end groups on the polymer chain derived from terephthalic acid moieties. Thus the sodium ions can be added as a sodium-PET component, that is, sodium neutralized PET. Sodium neutralized PET is a known material, the preparation of which is described in U.S. Pat. No. 4,830,621, the disclosure of which is incorporated herein by reference. Alternatively, sodium ions can be added in any other form which will form sodium-PET in situ, provided that the added anion will not exhibit any deleterious effects. For example, a suitable sodium ionomer can be used as the sodium source. Sodium salts of fatty acids are less desirable, since their presence may lead to reduction of the molecular weight of the polymer.

The amount of sodium ion which is present should normally be about 60 to about 250 parts per million, based on the PET. If less than about 60 parts per million are present the improved rate of crystallization will not be fully realized, whereas at above about 250 parts per million the crystallization rate would likely be too fast, making it difficult to cast amorphous sheet. Furthermore, the presence of excessive amounts of sodium ions may have a detrimental effect on the molecular weight of the polymer. Preferably the amount of sodium ion is about 100 to about 250 parts per million. If the sodium ion is supplied in the form of sodium-PET, the amount of sodium-PET required will of course vary with the number of neutralized acid end groups on the PET. Ordinarily an appropriate level of sodium can be supplied by addition of about 3 to about 15 percent by weight of a concentrate of PET resin containing about 800 to about 4500 parts per million sodium ion. Preferably about 5 to about 10 percent of sodium-PET containing about 1500 to about 2000 parts per million sodium ion can be used.

Although addition of sodium ions to PET results in good crystallization properties, such a composition alone is not fully suitable for preparation of thermoformed articles such as trays. That is, trays made from such a composition exhibit the formation of fine threads or feathers or "angel hair" when they are trimmed to final shape, especially by means of a punch cutter. The uneven edges thus formed are commercially unacceptable. In addition, such trays, when stacked, exhibit denesting or sticking problems, such that it becomes difficult to remove a single tray from a stack. In order to avoid these problems a small amount of a wax should be added to the polymeric composition. An amount of 0.05 to about 1.5 weight percent has been found to be appropriate, preferably about 0.1 to about 0.6 weight percent. At much lower levels the benefits of the wax are not fully realized, and at much higher levels the wax plates out on casting rolls and forming equipment.

The chemical identity of the wax is not believed to be particularly limiting, provided of course that it does not deteriorate under processing conditions or otherwise become ineffective. For example, the wax preferably should be substantially free from reactive groups or other moieties which would lower the intrinsic viscosity of the polyester matrix to such an extent that the resulting trays become brittle. Suitable waxes thus include polyolefin waxes such as polypropylene wax or polyethylene wax, preferably oxidized high density polyethylene wax and, especially, low density polyethylene wax. Waxes which may less suitable include paraffin wax, amide waxes, metallic soaps, and glycols. Yet even such waxes may provide some of the advantages of the present invention if the intrinsic viscosity of the starting polyester is sufficiently high that embrittlement is not a problem. It is also desirable, for trays to be used for food, that the wax have necessary governmental approvals for such use.

The wax can be supplied to the composition separately if desired, but more conveniently it is supplied as a concentrate of PET resin containing about 2 to about 11 percent wax. (Above levels of about 9 weight percent, the composition becomes difficult to melt blend.) This concentrate, if desired, can be the same concentrate which supplies the sodium ion, described above. Traditional amounts of other additives, such as antioxidants, fillers, whiteners such as titanium dioxide, colorants such as channel black or phthalocyanine, and processing aids can also be added to the composition, either separately or by way of a concentrate.

The components, whether supplied separately or by use of a concentrate, are melt blended together by customary means using equipment such as blenders or extruders. After blending, the polymeric mixture is normally extruded into a sheet by techniques well known to those skilled in the art of thermoforming polyethylene terephthalate. In particular, the molten sheet should be quenched promptly after it emerges from the die, in order to assure that the PET of the sheet is in a substantially amorphous state.

The articles of the present invention are finally prepared by subjecting the sheet to thermoforming. The sheet can be converted to a heat stable shape by any thermoforming method, such as vacuum assist, air assist, mechanical plug assist or matched mold thermoforming. Thermoforming methods such as these are well known to those skilled in the art, and normally include preheating of the sheet to above its glass transition temperature, in order to promote formability. The thermoforming mold itself should be heated to a temperature sufficient to allow the sheet to be shaped and permit the initially amorphous PET to crystallize to some extent, e.g., 25-35% The operable range of mold temperatures is about 120° to 215° C., with a preferred range of about 130° to 190° C. Examples of articles that can be prepared using thermoforming processes are containers such as bottles, jars, cans, bowls, trays, and dishes.

The formed part can be stripped out of the thermoforming mold cavity by known means. Once the heat-set part has been removed from the mold, the excess portion of the sheeting which remains attached to the part is trimmed away. The remainder of the material (regrind) can be reintroduced into the extruder and recycled as desired.

The advantages of the present invention reveal themselves in the thermoforming step and subsequent processing steps. The presence of the sodium ion provides for suitably rapid crystallization of the PET at the thermoforming temperatures, so that the initially amorphous material is at least partially crystallized within the length of time it is retained within the thermoforming mold. The presence of the wax provides freedom from formation of feathered edges upon trimming away of the excess portion of the sheeting and also minimizes problems with denesting or sticking of items such as trays, when they are stacked. The thermoformed parts further have good appearance and color properties.

EXAMPLES 1-2 AND COMPARATIVE EXAMPLES C1-C4

Cube blends were prepared of components A and B, as indicated in the following Table. Component A was polyethylene terephthalate resin containing about 0.2 weight percent copolymerized trimellitic acid branching agent, intrinsic viscosity 1.05, except as noted. Component B was either a single component or a precompounded blend of the components as indicated in the Table. The major constituent of Component B was either linear low density polyethylene (LLDPE) or sodium PET, i.e., the same PET as described above but containing 1770 ppm sodium and having an inherent viscosity of 0.70. Other materials present in component B in some of the examples included a wax, either oxidized high density polyethylene wax, 0.95 g/cm$^3$, m.p. 105° C. (Hoechst TM Wax PED 521), or low density polyethylene wax, 0.93 g/cm$^3$, m.p. 119° C. (Hoechst TM Wax PE 520), as well as titanium dioxide (TiPure TM R101) and phenolic antioxidant (Irganox TM 1010). (The amounts may not add to exactly 100% because of rounding.)

TABLE I

| | Composition, % by weight | | | | |
|---|---|---|---|---|---|
| Ex. | A | B | | | |
| C1 | 100 | none | — | — | — |
| C2 | 97 | LLDPE 3 | — | — | — |
| C3 | 92.5 | NaPET 7.5 | — | — | — |
| 1 | 92 | NaPET 7.5 | PED521 0.3 | TiO$_2$ 0.2 | Irg 0.02 |
| 2 | 92 | NaPET 7.5 | PE 520 0.3 | TiO$_2$ 0.2 | Irg 0.02 |
| C4 | 97$^a$ | LLDPE 3 | — | — | — |

$^a$PET, IV 0.95, from Goodyear.

The cube blends were dried and extruded into amorphous sheets. Certain of the sheets, 0.76 mm (30 mils) thick, were thermoformed into crystallized trays. A comparative thermoforming run was started by adjusting the conditions for commercial material (Comparative Example C4) to give best forming results and then varying cycle time for a control (Comparative Example C1) and a sheet containing sodium containing PET as the only additive (Comparative Example C3). For this comparative thermoforming run the oven heaters were set at 421° C. and mold temperature at 177° C. Forming times for optimum performance were as shown in Table II:

TABLE II

| Example | Cycle Time, seconds |
|---|---|
| C4 | 5.7 to 7.0 |
| C1 | 10.7 to 12 |
| C3 | 6.0 to 6.6 |

It can be seen that thermoforming rate of the PET/NaPET blend (C3) matches the commercial CPET control (C4) which is a blend with polyethylene. However, the trays without polyethylene (C3) were observed to cut poorly on the tray trimming press, generating hairs and feathered edges, making them commercially unacceptable. The cut trays when stacked also exhibited a sticking or denesting problem which would make them unacceptable.

CPET trays from the wax-containing blend of Example 1 were prepared as described above. Trays from this composition were observed to cut without generating hairs or feathered edges and did not exhibit a denesting problem.

The quality of the cutting or trimming of samples of the present invention and comparative samples was further determined by casting blends into 0.025 mm (10 mil) amorphous sheets followed by annealing for 3 hours at 150° C. Squares 64 mm (2.5 inches) on a side were cut from each sheet using a clicker cutter. In Table III below, the quality of each cut has been ranked from 3 to 1. A "3" indicates many undesirable "angel hairs" were present, while a "1" indicates the presence of few if any angel hairs.

TABLE III

| Example | Quality of Cut |
|---|---|
| C1 | 3 |
| C2 | 2 |
| C3 | 3 |
| 1 | 1 |
| 2 | 1 |

The results show that PET alone (C1) cuts very poorly. The presence of LLDPE, a commonly used nucleant, improves the quality of the cut somewhat (C2). Sample C3, containing sodium PET without wax, likewise cuts very poorly even though the data in Table II shows that it thermoforms well. The addition of wax (Examples 1 and 2) greatly improves the relative quality of the cut.

In order to assess the color of various samples, injection molded plaques, 3.2 mm (0.125 inches) thick were prepared and annealed for 3 hours at 150° C. The Hunterlab color of the plaques was measured according to ASTM D2244-89, and is reported in Table IV in terms of L, a, and b values. "L" indicates the degree of whiteness (100 is white, 0 is black, absolute values being a function of the particular measuring instrument used), the "a" refers to green/redness (a negative value indicating slight greenness), and the "b" refers to yellow/blueness (a small positive value, indicating slight yellowness, is desired).

TABLE IV

| Example | Color | | |
|---|---|---|---|
| | L | a | b |
| C1 | 65.2 | −1.2 | 0.4 |
| 1 | 75.1 | −1.1 | 3.1 |
| 2 | 78.1 | −1.7 | 2.0 |
| C4 | 78.6 | −2.7 | 2.0 |

The results show that the composition of Comparative Example C1 has comparatively poor color. The blend of Example 1 exhibited significantly better color, and that of Example 2 even better, equivalent to that of C4, the commercial blend with polyethylene.

What is claimed is:

1. A process for preparation of a thermoformed article, comprising the steps of
    (a) blending together
        (i) about 90 to about 99.9 percent of weight of a thermoplastic, crystallizable polyester resin;
        (ii) an amount of sodium ion sufficient to function as an effective crystallization agent; and
        (iii) about 0.05 to about 1.5 percent by weight of wax;
    (b) extruding the blend into a sheet;
    (c) thermoforming the sheet into an article; and
    (d) trimming excess material from the periphery of the thermoformed article.

2. The process of claim 1 wherein the thermoplastic, crystallizable polyester resin is polyethylene terephthalate.

3. The process of claim 2 wherein the amount of sodium ion is about 60 to about 250 parts per million.

4. The process of claim 2 wherein the amount of sodium ion is about 100 to about 150 parts per million.

5. The process of claim 2 wherein the amount of wax is about 0.1 to about 0.6 percent by weight.

6. The process of claim 2 wherein the sodium ion is supplied by addition of about 3 to about 15 percent by weight of a concentrate of polyethylene terephthalate resin containing about 800 to about 4500 parts per million sodium ion.

7. The process of claim 6 wherein the concentrate is sodium carboxylate chain ended polyethylene terephthalate.

8. The process of claim 2 wherein the wax is low density polyethylene wax.

9. The process of claim 2 wherein the wax is oxidized high density polyethylene wax.

* * * * *